US006921142B2

(12) United States Patent
Wah

(10) Patent No.: US 6,921,142 B2
(45) Date of Patent: Jul. 26, 2005

(54) INTERCHANGEABLE BATTERY PACK FOR A PORTABLE COMPUTER

(75) Inventor: Chow Kum Wah, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 10/222,357

(22) Filed: Aug. 16, 2002

(65) Prior Publication Data

US 2002/0197526 A1 Dec. 26, 2002

Related U.S. Application Data

(62) Division of application No. 09/538,824, filed on Mar. 30, 2000, now Pat. No. 6,460,947.

(30) Foreign Application Priority Data

Jul. 26, 1999 (SG) .............................................. 9903603

(51) Int. Cl.[7] .............................................. A47B 97/00
(52) U.S. Cl. .................................................. 312/223.1
(58) Field of Search .......................... 312/223.1, 223.2, 312/205, 313, 352; 429/99, 100

(56) References Cited

U.S. PATENT DOCUMENTS

| | | | |
|---|---|---|---|
| 4,132,295 A | | 1/1979 | Hochfelsen .................... 190/60 |
| 4,958,889 A | | 9/1990 | Boyle et al. ................. 312/208 |
| 5,797,089 A | * | 8/1998 | Nguyen ....................... 455/403 |
| 5,872,831 A | | 2/1999 | Zoiss et al. .................... 379/21 |
| 6,144,358 A | * | 11/2000 | Narayanaswamy et al. . 345/102 |
| 6,291,095 B1 | | 9/2001 | Griffey et al. ................. 429/65 |
| 6,325,353 B1 | * | 12/2001 | Jiang ........................... 248/682 |
| 6,480,391 B1 | * | 11/2002 | Monson et al. ............. 361/752 |

FOREIGN PATENT DOCUMENTS

EP 472361 * 2/1992

* cited by examiner

Primary Examiner—James O. Hansen

(57) ABSTRACT

A battery casing is adapted to fit into at least two different receiving bays of different sizes. The casing includes an adapter panel which is movable into at least two positions. Moving the adapter panel to the first position increases the effective width of the casing, and allows the battery to be inserted securely into a first receiving bay. Moving the adapter panel to the second position maintains the original width of the casing. This allows the battery casing to be inserted securely into a receiving bay, which has the same width as that of the original casing.

11 Claims, 6 Drawing Sheets

INTERCHANGEABLE BATTERY PACK FOR A PORTABLE COMPUTER

CROSS-REFERENCE TO RELATED APPLICATIONS

This application is a divisional of U.S. patent application Ser. No. 09/538,824, filed Mar. 30, 2000, now U.S. Pat. No. 6,460,947, which claims the benefit under 35 U.S.C. 111(b) of Singapore patent Application No. 9903603-0, filed Jul. 26, 1999. Both of the aforementioned applications are incorporated herein by reference.

FIELD OF THE INVENTION

The present invention relates to packaging technology. In particular, the present invention relates to the packaging of batteries in portable computers.

BACKGROUND OF THE INVENTION

Portable computers are commonly provided with two receiving bays. One bay is configured to receive the battery pack, and the other bay, referred to as the secondary or multi-bay, is for optional accessories such as an optical disc player or floppy disc drive. To operate the portable computer without an external power source, a rechargeable battery can be inserted in the battery receiving bay in the computer. When the battery runs low, the user typically must remove the used battery, and replace it with a charged battery.

Many users of portable computers have found that, under some circumstances, the amount of electricity stored in a standard battery, such as an eight-cell battery, is insufficient. When the battery runs low, computer usage must be interrupted while the spent battery is replaced. One solution to this problem is to increase the capacity of the battery. This, however, means increasing the size and weight of the battery pack or casing. Not only is this undesirable, given the trend towards more compact models, but a larger battery also requires a larger receiving bay. Thus, increasing battery capacity translates into higher costs for manufacturing a different computer housing, together with all the re-designing associated with these modifications. An alternative solution is to use a second battery which can be fitted into the multi-bay. Because, however, the multi-bay is designed for use with various peripheral drives, the size of the multi-bay is different than the battery receiving bay. Consequently, the user would need two batteries of different sizes, which are not interchangeable, to operate the computer with two batteries (one in the battery receiving bay and one in the multi-bay). Alternatively, a completely new housing and hardware design must be made to make the battery receiving bay identical to the multi-bay. Both of these solutions, however, are costly.

SUMMARY OF THE INVENTION

The present invention provides a casing which is adapted to fit into at least two receiving bays of different sizes. The casing has a predetermined height, width and depth to fit into a first receiving bay and is further provided with an adapter member which is movable into at least two positions. Moving the adapter member to the first position increases the effective width of the casing, and allows it to be inserted securely into the first receiving bay. Moving the adapter member to the second position maintains the original width of the casing and allows it to be inserted securely into the second receiving bay, which preferably has the same width as that of the original casing.

In the preferred embodiment, the present invention is a battery casing designed for battery cells. The adapter member is a panel attached to one side of the battery casing by a hinge, so that the battery may be used interchangeably in both the first and second receiving bays. In this manner, only one type of battery is required to provide a dual battery capability to a computer with two receiving bays of different sizes, and the existing housing design may be used with minimal changes.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not in function. In the following discussion, and in the claims the terms "including", "having" and "comprising" are used in an open-ended fashion, and thus should be interpreted to mean "including but not limited to . . . ". Also, the term "couple" or "couples" is intended to mean either an indirect or direct electrical connection. Thus if a first device "couples" to a second devices, that connection may be a direct electrical connection or through an indirect electrical connection via other devices or connections. Finally, the terms "width" and "height" should be broadly interpreted herein to refer to the length of different sides of a battery casing.

DESCRIPTION OF THE PREFERRED EMBODIMENT

The following description pertains to the exterior casing of a battery for portable computers, and is used as the preferred embodiment for implementing the underlying principles of the present invention. Numerous specific details are set forth such as specific receiving bays for a portable computer in order to provide a thorough understanding of the present invention. It should be understood that the overview is not intended to limit the scope of the present invention, and thus the battery casing described herein can be used in other computer designs without departing from the principles of the present invention. In addition, one skilled in the art will understand that certain computer system components have been omitted in the following discussion so as not to digress unnecessarily from the focus of the present invention. It should be understood by one skilled in the art that batteries contain well known elements such as battery cells, with the appropriate internal electrical and electronic connections and control elements. Furthermore, the appropriate electrical coupling is provided for the inserted battery to supply power to the computer.

Figure 1A:
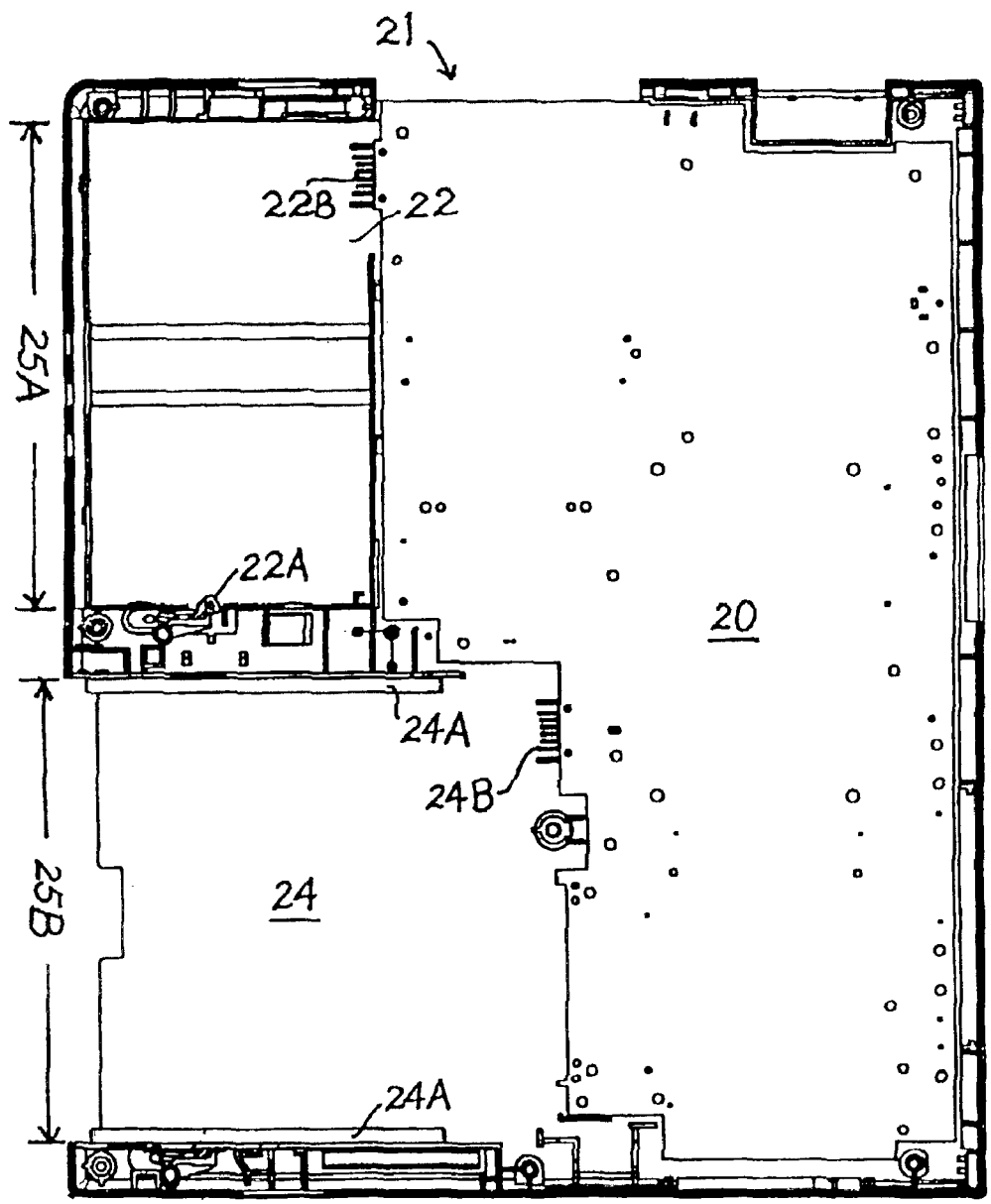
FIGS. 1A and 1B are a plan view and elevated view respectively of the base of a conventional computer housing.
Figure 1B:
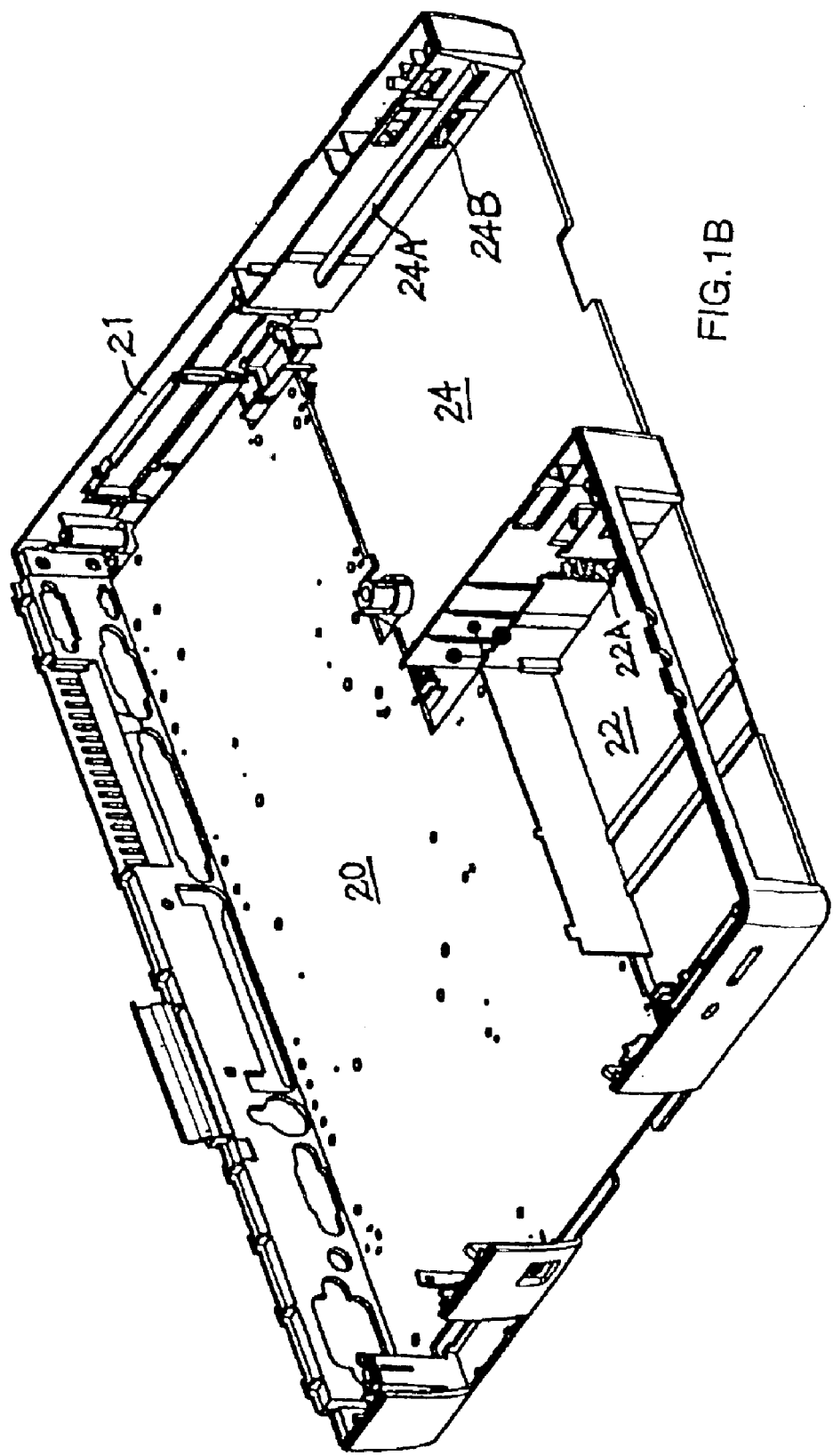

FIGS. 1A and B show an example of a housing 21 of a portable computer which has a primary bay 22 for receiving an 8-cell battery, and a secondary or multi-bay 24 for other peripheral functions such as disk, CD or DVD drive. The motherboard 20 is also shown. As in many commonly available portable computers, the primary bay 22 is different in size than the secondary bay 24. In this example, the primary bay 22 has a width 25A of 138 mm, which is 5 mm longer than the width 25B of the secondary bay 24. A latch 22A mounts on the side of primary bay 22 for mechanically securing a battery inside the bay. Rails 24A are provided in the secondary bay 24 for mechanically supporting the optional accessories. In addition, a second latch 24B mounts on the side of secondary bay 24 for securing a battery inside the bay. Battery connectors 22B and 24B are provided at the back of the primary and secondary bays, respectively, for coupling with an inserted battery.

Figure 2A:
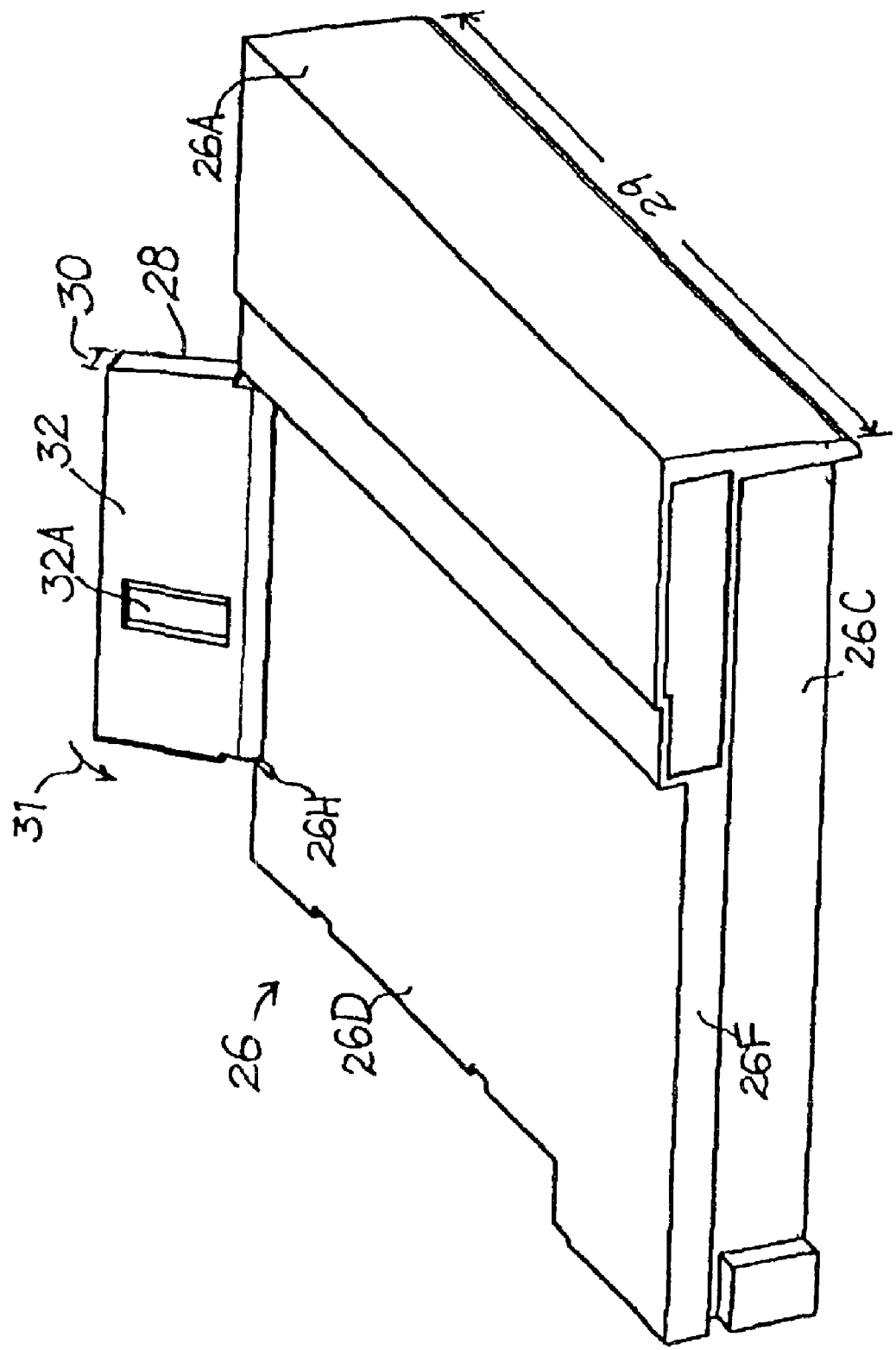
FIG. 2A is a left side elevated view of a battery casing according to the present invention with the adapter panel in an intermediate position.
Figure 2B:
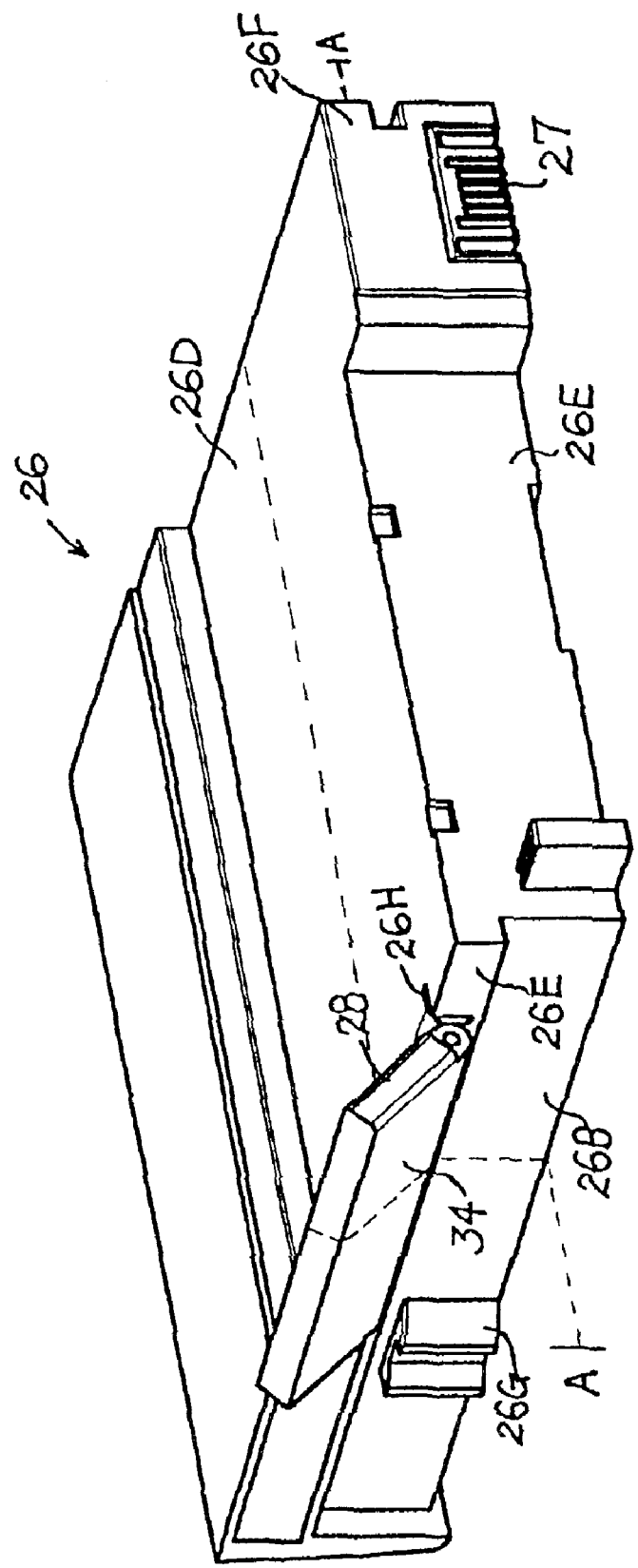
FIG. 2B is a right side elevated view of the same battery casing as in FIG. 2A.
Figure 2C:
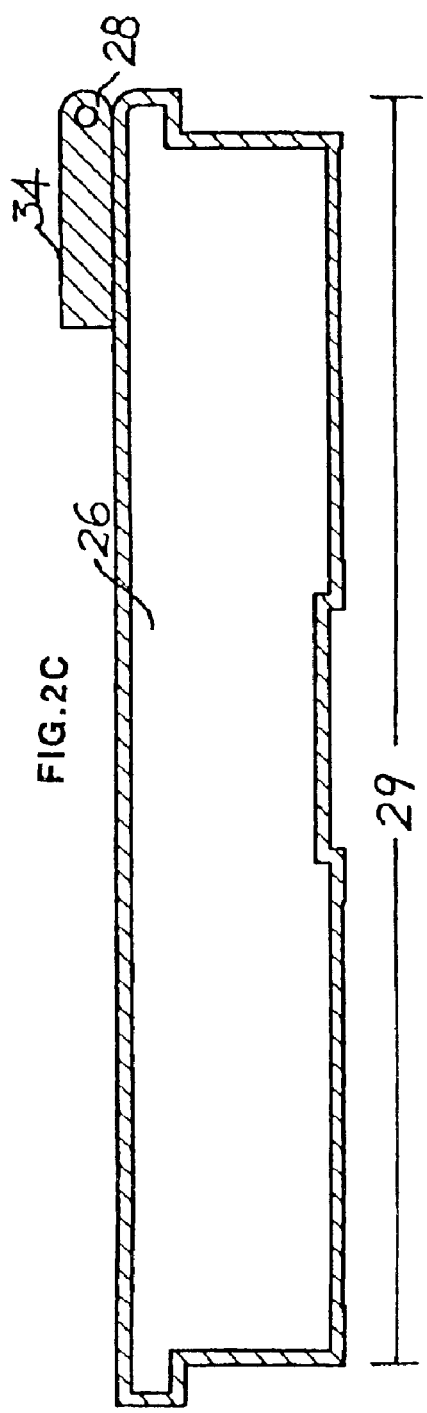
FIGS. 2C and D are cross-sectional views of the battery casing along section A—A indicated in FIG. 2A with the adapter panel in the second position (FIG. 2C) and first position (FIG. 2D).
Figure 2D:
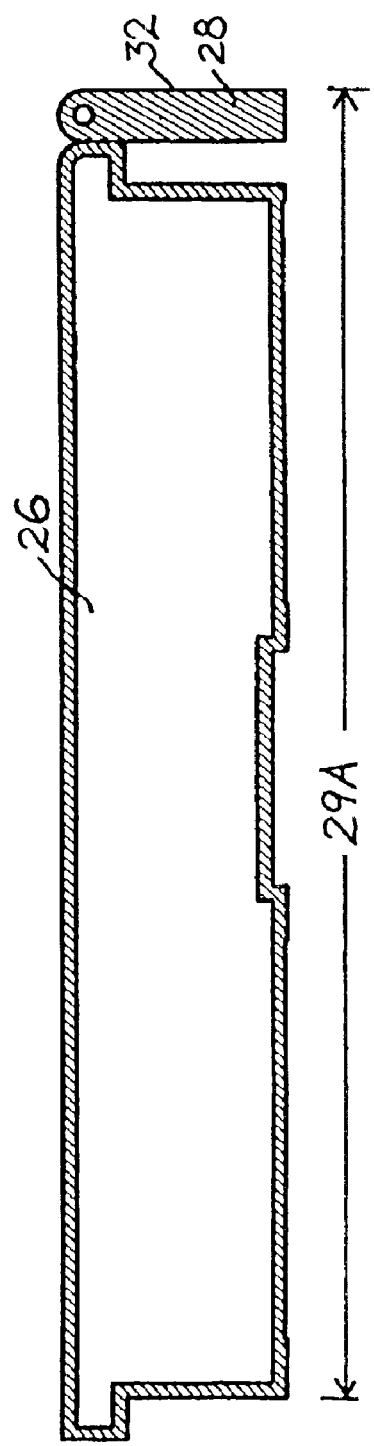

Referring now to FIGS. 2A–D, the following discussion details the manner in which a battery is adapted to fit into both the primary and secondary bays of the housing according to the preferred embodiment. As used herein, casing refers to the outer covering for the battery cells and other related electronic components such as the PCB board. The casing has a predetermined and fixed dimension. The battery refers to the casing and the attached adapted. The dimension of the battery, therefore, is easily adjustable according to the positioning of the adapter. In this embodiment, the casing 26 of the battery contains 12 battery cells and a PCB board for electronic control (not shown). Casing 26 also comprises a front 26A, a right side 26B, left side 26C, top 26D, bottom (not shown), back 26E and connector 27. An adapter panel 28 preferably attaches to the right side 26B of the casing by a hinge. The casing preferably has a width 29 that is the same as the width of the secondary bay 24. The thickness 30 of the adapter panel 28 preferably is the same as the difference in width between the primary and secondary bay (i.e., 5 mm in this example). When the panel is rotated (as shown by arrow 31 in FIG. 2A) to the first position juxtaposing the side of the casing (as shown in FIG. 2D), the effective width of the battery (as indicated by reference numeral 29A) is lengthened by 5 mm to a total of 138 mm, and the battery may be inserted securely into the primary bay. In this position, the effective height of the battery is the same as the actual height of the casing. When the panel is rotated to the second position juxtaposing the top of the casing, the effective width of the battery is reduced to become the actual width of the casing, i.e. 133 mm, while the effective height of the battery is increased by 5 mm. Since there is sufficient height in the secondary bay to accommodate the increased effective height of the battery, it may be inserted securely into the secondary bay.

The panel and the exterior surface of the casing are also provided with the necessary landscape to interact with the securing elements in the receiving bays. Referring still to FIGS. 1A, 1B, 2A and 2B, recess 32A on the external surface 32 of the adapter panel 28 is adapted to mechanically couple to latch 22A of the primary receiving bay 22, such that the battery may be secured upon insertion. The casing 26 is also provided with overhanging ribs 26JE and 26F on the right side 26B and the left side 26C respectively. These ribs allow the battery to be fitted into the secondary bay 24 with the ribs 26J, 26F sliding above rails 24A. An additional protrusion 26G is provided on side 26B for mechanically coupling with latch 24B of the secondary bay. Release buttons (not shown) are also preferably provided to release each of the latches when the user is ready to remove the batteries.

Figure 3:
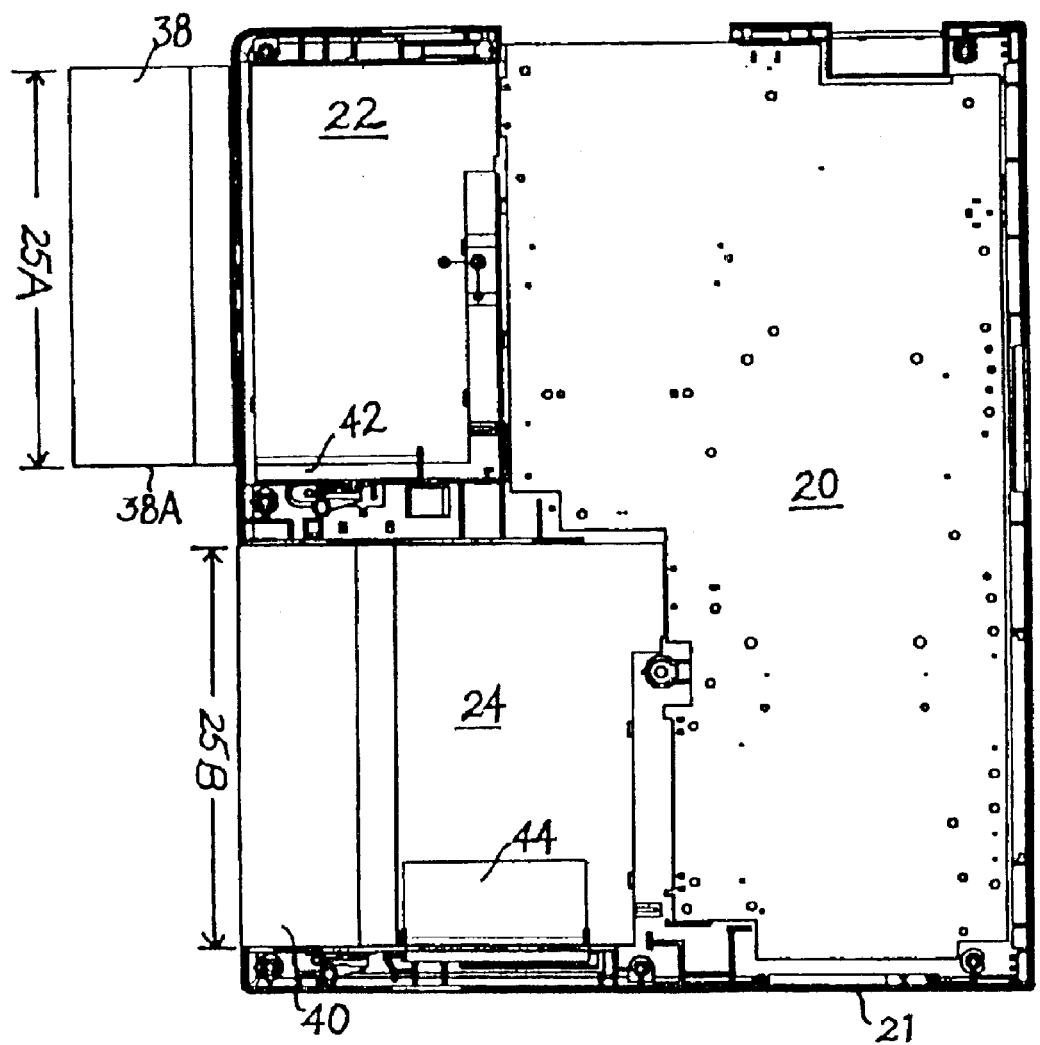
FIG. 3 is a plan view of the base of conventional computer housing shown in FIG. 1 with two of the batteries according to the present invention inserted into the primary and secondary bays.

Referring now to FIG. 3, this example shows how two identical batteries 38 and 40 are inserted into two different receiving bays 22, 24 of a portable computer. Only the base of the computer housing and the receiving bays are shown in order to focus on the present invention. In this example, battery 38 is inserted into the primary receiving bay 22 of the computer, and battery 40 is inserted into the secondary receiving bay 24. For battery 38, the adapter panel 42 is juxtaposing the right side 38A of the casing. For battery 40, the adapter panel 44 is juxtaposing the top of the casing. The adapter panels 42 and 44 are each 5 mm in thickness. Therefore, the effective width 25A of battery 38 is 138 mm, which is 5 mm larger than the actual size of the battery casing. Since the height of secondary bay 24 is more than 5 mm taller than the height of primary bay 22, the increased height of battery 40 when adapter panel 44 is rotated to the top side does not hinder its insertion into secondary bay 24.

Referring again to FIGS. 2A and 2B, the hinges are preferably double hinges of the rotatable and reversible type. In the preferred embodiment, the panel 20 connects to the casing via a pair of metallic hinges each containing two loops, one loop for securing the hinge to the casing, and the other loop for securing the hinge to the panel. The loops of the hinges are rotatable, and the points of attachment to the casing and the panel are recessed into the landscape, such that they do not protrude to interfere with the insertion of the battery in the bay. One of these recesses is shown as reference numeral 26H in FIGS. 2A and B.

In the embodiment described above, the adapter is used to secure the battery into the respective receiving bays by a width-wise fit, and thus the heights of the bays in this example do not play an important role in securing the battery, as long as the height of the bay is taller than the effectively height of the battery. In other instances, the shape of the casing may be designed such that the effective height of the casing does not change when the adapter moves from the first to the second position. In such a situation, a recessed space may be provided in the casing to accommodate the adapter when it is rotated to the first position.

Other types of position guiding and securing features, besides the latch and rails described above, may be provided to secure the casing to the receiving bay. If securing structures are provided on the inner walls of the receiving bays, the two side walls of the casing would also have the appropriate matching features or landscape. Furthermore, at least one of the two external surfaces of the adapter panel should also have the matching features.

While the present invention has been described particularly with reference to the aforementioned figures with emphasis on a battery for use with a primary and secondary bay of a portable computer of the described dimensions, it should be understood that the figures are for illustration only and should not be taken as limitation on the invention. In addition, the size interchangeability principles may be applied to other industries where it is necessary or desirable to mount packages interchangeably in receptacles of different sizes. It is clear that other variations and embodiments are also within the scope of the invention, based on the teachings disclosed herein. These variations include packages with adapter panels which allow a height-wise fit, and casings with the size adapter panel of different thickness and shapes for use in other applications. In addition, more than one adapter member may be used to vary the dimensions of the sizes and shapes of a packaging. For specific applications, the appropriate landscape may be provided on the panel and the exterior surface of the casing to match the corresponding receiving bay.

The invention claimed is:

1. An electronics package for a computer system having a plurality of bays of different sizes, comprising:

a casing having a predetermined width, height and depth; and at least one adapter panel attached to said casing and being movable between least at first position and a second position; said adapter panel in the first position juxtaposing one side of said casing for increasing the effective width of said casing, and said adapter panel in the second position juxtaposing an adjacent side of said casing for maintaining the predetermined width of said casing;

said adapter panel permitting said casing to be mated with said plurality of different size bays;

wherein said casing has two opposing sides, a top, a bottom, a front and a back, and said adapter panel in said first position is juxtaposing one of said sides for increasing the effective width and maintaining the original height of said casing; and said panel in said second position is juxtaposing the top of said casing for increasing the effective height and maintaining the original width of said casing.

2. The electronics package according to claim 1 wherein said adapter panel is attached to said casing by a hinge.

3. The electronics package according to claim 1 wherein said adjacent side includes a recess for receiving said adapter panel when the adapter panel is in the second position to maintain the original predetermined height of said casing.

4. The electronics package according to claim 1 wherein said casing has two opposing sides, a top, a bottom, a front and a back, and said panel in said first position is juxtaposing one of said sides.

5. The electronics package according to claim 1 wherein said casing has two opposing sides, a top, a bottom, a front and a back; said adapter member being attached to said casing by a hinge; said adapter member in said first position juxtaposing one of said sides for increasing the effective width of said casing; and said adapter member in said second position is juxtaposing the top of said casing for maintaining the original width of said casing.

6. An electronics package for a computer system having a plurality of bays of different sizes, comprising:

a casing having a predetermined width, height and depth; and at least one adapter panel attached to said casing and being movable between at least a first position and a second position; said adapter panel in the first position juxtaposing one side of said casing for increasing the effective width of said casing, and said adapter panel in the second position juxtaposing an adjacent side of said casing for maintaining the predetermined width of said casing;

said adapter panel permitting said casing to be mated with said plurality of different a bays, wherein the electronics package is adapted to mate to the bays in the computer system, the bays include a primary bay and a secondary bay, said primary and secondary bays including a connector to electrically interface said electronics package and said computer; said primary bay having a width larger than the width of said secondary bay; said electronics package adapted for secure insertion into said primary bay when said adapter panel is rotated into said first position such that electrical connection is made with said computer; said electronics package further adapted for secure insertion into said secondary bay when said panel is rotated into said second position such that electrical connection is made with said computer.

7. The electronics package according to claim 6 wherein said casing has two opposing sides, a top, a bottom, a front and a back, said panel in said first position is juxtaposing one of said sides, said panel in said second position is juxtaposing said top.

8. The electronics package according to claim 7 further comprising a mating element provided on one side of said casing, said mating element adapted to mate with a latch provided at the side of said secondary bay for securing said electronics assembly upon insertion.

9. The electronics package according to claim 7 further comprising a mating element provided on at least one exterior surface of said adapter panel, said mating element adapted to mate with a latch provided at the side of said primary bay for securing said electronics assembly upon insertion.

10. The electronics package according to claim 7 further comprising a mating element provided on one side of said casing, said mating element adapted to mate with a latch provided at the side of said secondary bay for securing said electronics assembly upon insertion; and a second mating element provided on at least one exterior surface of said adapter panel, said mating element adapted to mate with a second latch provided at the side of said primary bay for securing said electronics assembly upon insertion.

11. An electronics package for a computer system having a plurality of bays of different sizes, comprising:

a casing having a predetermined width, height and depth; and at least one adapter panel attached to said casing and being movable between a least a first position and a second position; said adapter panel in the first position juxtaposing one side of said casing for increasing the effective width of said casing, and said adapter panel in the second position juxtaposing an adjacent side of said casing for maintaining the predetermined width of said casing;

said adapter panel permitting said casing to be mated with said plurality of different size bays, wherein the bays include a primary bay and a secondary bay and wherein the width of said casing matches the width of said secondary bay such that said electronics assembly may be slidably secured by the sides to the secondary bay when said panel is in said second position; and the effective width of said electronics assembly matches the width of said primary bay when said panel is in said first position such that said electronics assembly may be slidably secured by the sides to the primary bay.

* * * * *

UNITED STATES PATENT AND TRADEMARK OFFICE
CERTIFICATE OF CORRECTION

PATENT NO.       : 6,921,142 B2                                           Page 1 of 1
APPLICATION NO.  : 10/222357
DATED            : February 22, 2005
INVENTOR(S)      : Chow Kum Wah It is certified that error appears in the above-identified patent and that said Letters Patent is hereby corrected as shown below:

IN THE CLAIMS

Claim 1, Column 5, line 14, after "between" insert --at--

Claim 1, Column 5, line 14, after "least" delete "at" and insert --a--

Claim 6, Column 5, line 64, after "different" delete "a" and insert --size--

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

PATENT NO.         : 6,921,142 B2                                            Page 1 of 1
APPLICATION NO.  : 10/222357
DATED              : July 26, 2005
INVENTOR(S)       : Chow Kum Wah It is certified that error appears in the above-identified patent and that said Letters Patent is hereby corrected as shown below:

IN THE CLAIMS

Claim 1, Column 5, line 14, after "between" insert --at--

Claim 1, Column 5, line 14, after "least" delete "at" and insert --a--

Claim 6, Column 5, line 64, after "different" delete "a" and insert --size--

This certificate supersedes the Certificate of Correction issued May 27, 2008.

Signed and Sealed this

Twenty-fourth Day of June, 2008

JON W. DUDAS
*Director of the United States Patent and Trademark Office*